March 21, 1944.   R. M. HEINTZ   2,344,867
GOVERNOR
Filed Nov. 2, 1942   2 Sheets-Sheet 1

INVENTOR.
RALPH M. HEINTZ
BY
ATTORNEY

March 21, 1944.     R. M. HEINTZ     2,344,867
GOVERNOR
Filed Nov. 2, 1942     2 Sheets-Sheet 2
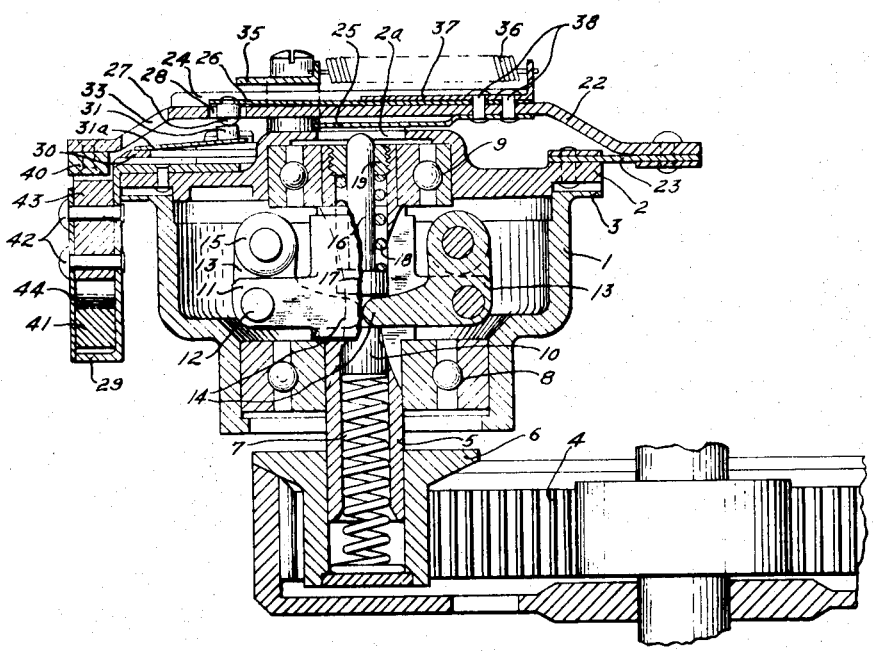
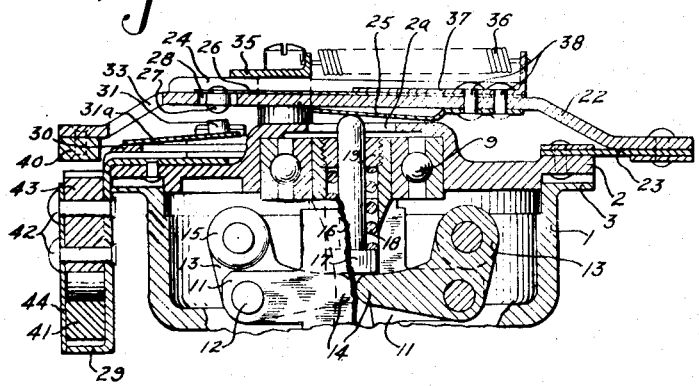
INVENTOR.
RALPH M. HEINTZ
BY
Frank &H Johnson
ATTORNEY Patented Mar. 21, 1944

2,344,867

UNITED STATES PATENT OFFICE 2,344,867

GOVERNOR

Ralph M. Heintz, Cleveland, Ohio, assignor to Jack & Heintz, Inc., Bedford, Ohio, a corporation of Ohio Application November 2, 1942, Serial No. 464,269

7 Claims. (Cl. 200—80)

This invention relates to governors for controlling the speed of electrically driven mechanisms.

While the invention is of general application to control the speed of any electrically driven device or mechanism, it has particular utility in connection with electric starters for internal combustion engines, and particularly the engines of land vehicles and aircraft. Such starters usually include an inertia member in the form of a flywheel, and as the trend in engines has been toward larger engines of greater power it has been necessary to provide starters of greater power, both as regards the electrical power input and also the amount of energy stored by the flywheel. In the case of aircraft engines, the size and weight limitations have resulted in a trend toward higher speeds for the starter motor and flywheel in order to develop sufficient power to crank the larger engines. The motors for such starters now operate in the range of 20,000 to 30,000 R. P. M. which approaches the safe limit for conventional commutator construction, and a governor consequently becomes necessary to prevent over speeding.

The power circuit for the starting motor is usually controlled by a relay and this device is also subject to not only size and weight limitations, but also current limitations. Such relays are designed to give satisfactory service in normal operation for a period of time corresponding to the length of the intervals between motor overhauls, which effects a maximum economy of weight and solenoid current but which renders the relay liable to premature failure if it is subjected to an excessive number of operations by the governor. It is therefore important that the governor switch in this type of starting system have a suitable differential between opening and closing speeds to prevent chattering or excessive repetitions of operation of the relay, even under the most unfavorable operating conditions.

The object, in general, of the present invention is therefore to provide a governor having characteristics suitable for operation in an aircraft starting system of the type described. Further and more particular objects are to provide an improved governor of a size capable of installation in a starter unit, which is light in weight, accurate and reliable in service, and which has a suitable differential between opening and closing speeds to avoid unnecessary operation of the motor relay. These and other objects will become apparent as the description proceeds in connection with the accompanying drawings illustrating a preferred embodiment of the invention.

In the drawings:

Figure 3 is a longitudinal sectional view taken at right angles to Figure 2, approximately on the line 3—3 of Figure 1, and showing the driving arrangement for the governor, the switch being in closed position; and Figure 4 is a fragmentary view similar to Figure 3, but showing the parts in switch opening position.

Figure 1:
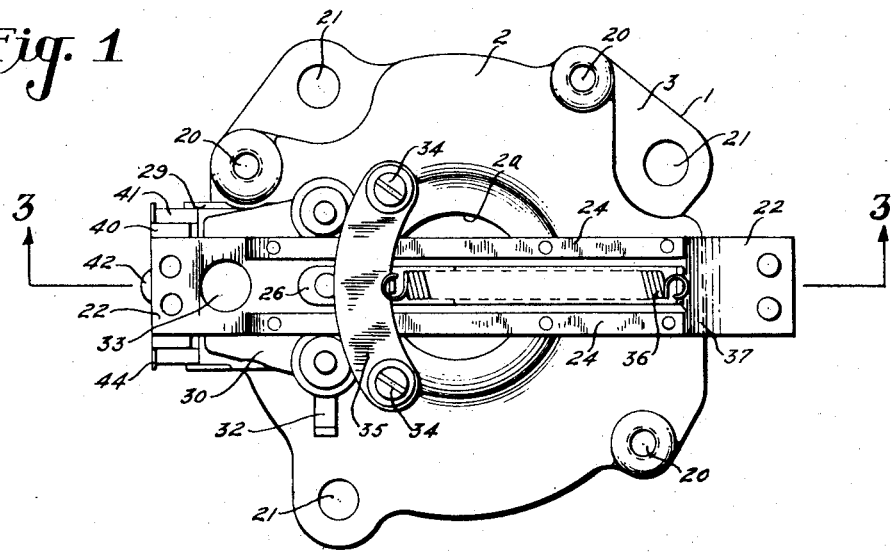
Figure 1 is a top plan view of the governor of the present invention.
Figure 2:
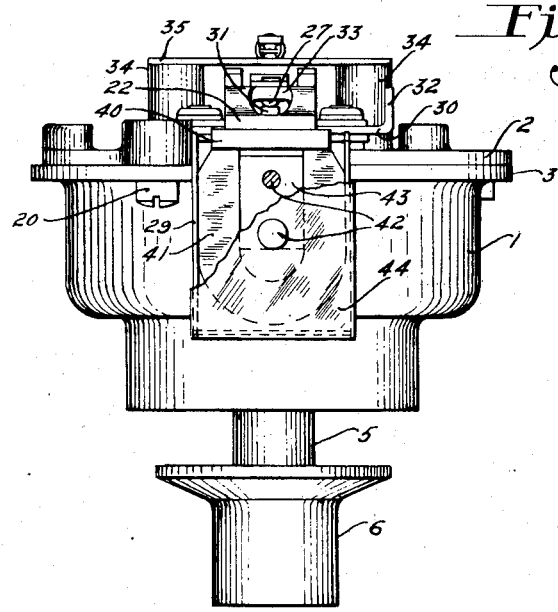
Figure 2 is an elevational view of the governor with certain parts broken away.

In the preferred embodiment illustrated there is a governor mechanism contained within a cupped housing 1, and a switch mechanism carried by a plate 2 mounted on said housing, the housing being provided with a top flange 3 for mounting the whole device in operative relation with a rotating element 4 whose speed is to be governed. In the present instance the element 4 is represented as a ring gear in an electric starter, the whole device shown being contained within the gear housing of the starter. The governor mechanism responds to the rotation of a hollow shaft 5 having a resiliently mounted driving member 6 frictionally engaging the upper rim of the ring gear 4.

The resilient mounting of the driving member 6 is accomplished through the agency of a spring element 7 having one end frictionally secured in the shaft 5 abutting a plug 10 and having the other end frictionally secured in the member 6, whereby the member 6 is capable of axial and torsional movements with respect to the shaft 5. The spring 7 is stiff enough to establish a satisfactory driving engagement between the members 4 and 6, and at the same time is capable of absorbing vibration and acceleration stresses which would over stress a positive driving connection. The shaft 5 is carried in a lower bearing 8 in the housing 1, and an upper bearing 9 in the plate 2.

The shaft 5 is provided with arms 11 carrying pivots 12 for bell crank arms 13. The bell crank arms have inner ends 14 extending within the hollow shaft, and outer ends carrying governor weights 15. A pin, or plunger, 16 having a head 17 bears against the ends 14 under the pressure of a spring 18 which seats against an apertured plug 19 secured in the upper end of the shaft 5. The plug 19 serves additionally as a guide for the shank of the pin 16. The spring 18 is designed to hold the plunger 16 and governor weights in substantially the positions shown in Figure 3 until the maximum operating speed is approached, whereupon the governor weights 15 will be influenced by centrifugal force sufficiently to lift the pin 16 against the force of said spring and project the end of the pin through a central opening 2a in the plate 2. If desired, additional external tension springs may be applied, tending to draw the weights 15 together, opposite ends of the springs being attached to diametrically opposite weights or upstanding portions of the bell crank arms 13.

The mechanism just described constitutes a speed responsive switch actuating mechanism wherein the pin, or plunger, 16 may be said to be a speed responsive member movable to different positions in response to the speed of rotation of the shaft 5. The switch mechanism operated by the plunger 16 is carried by the plate 2, this plate being secured in a definite relation to the plunger by means of screws 20 engaging the flange 3 to clamp the parts 1 and 2 together. Additional openings 21 are provided in the flange 3 for mounting the device as a whole in operative driving relation to the mechanism to be controlled.

The numeral 22 designates a movable switch arm mounted on an overhanging cantilever spring element 23, the arm 22 having its rigidity increased, if necessary, by the addition of strips or ribs 24 which may be attached to the arm or formed integrally therewith. The spring element 23 may exert a downward bias on the arm 22 while acting as a resilient hinge for this member. The under side of the arm 22 carries a resilient abutment in the form of a flat spring element 25 arranged to be engaged by the plunger 16 and to ultimately transmit the motion thereof to the arm 22. On the top side of the arm 22 is a leaf spring element 26 resiliently carrying a contact 27 projecting through an opening 28. Beneath the contact 27 a frame 29 and a terminal member 30 carrying a resiliently fixed contact 31 on a spring tongue 31a are commonly secured to the plate 2, the parts 30 and 31 being insulated from all parts of the structure and having in the present embodiment an upstanding lug, or ear, 32 for an external circuit connection. The other side of the circuit is completed through arm 22 to ground. An opening 33 in the arm 22 permits observation and cleaning of the contacts.

A pair of posts 34 carry a bridge 35 to stop the upward movement of arm 22. If desired, a tension spring 36 may be provided to add to the bias effect of the spring support 23 in returning the switch arm 22 to closed circuit position. In the present embodiment one end of spring 36 is attached to the bridge 35 and the other end is attached to an upstanding end on a strip 37 which overlies a part of the length of spring element 26. The optimum length of the strip 37 may be determined by test in the course of manufacture, to impart the desired degree of stiffness to the spring element 26. It is noted that the spring elements 25 and 26, and the strip 37, are all secured to the switch arm 22 by a common means, here shown in the form of the two rivets 38.

Downward, or circuit closing, movement of switch arm 22 is stopped by the contact of an armature 40 on the arm with the pole faces of a permanent magnet 41 carried in the aforementioned frame 29 directly beneath the movable end of the arm. The magnet 41 may conveniently be secured in the frame 29 by means of rivets 42 passing through a block of non-magnetic material 43 and clamping a plate 44 over the parts in the manner shown, non-magnetic materials being used, in general, throughout the device. The positioning of the parts is such as to bring the contacts 27 and 31 into engagement before the armature 40 contacts the magnet 41, the last part of the downward movement of arm 22 deflecting both of these contacts with a mutual wiping action, and the final contact pressure being determined by the stiffness of spring 26 and the tongue 31a. The wiping action is enhanced by a slight rocking motion of the contacts incident to the bending of spring 26 and tongue 31a as the contacts are brought to bear upon each other.

Figure 3 shows the position of the parts at rest or low rotational speeds. At high speeds the governor weights 15 rotate the bell crank arms 13 and start to raise the plunger 16 against the force of spring 18, bringing the plunger into engagement with the added resistance of the resilient abutment 25. At a predetermined high speed the increased upward force of plunger 16 deflects the abutment 25 to the point where it overcomes the total downward bias exerted by the springs 23 and 36 and the magnet 41. When this overbalance of forces occurs the arm 22 moves upwardly with a snap action against the bridge 35, the resilient mounting of the contacts 27 and 31 causing them to remain in electrical engagement until the upward movement of the arm 22 has attained considerable velocity, to insure a quick break of the electrical circuit.

Once the arm 22 has thus been moved to its uppermost position as shown in Figure 4 it is held there by the continued upward pressure of the plunger 16, it being appreciated that the downward bias is reduced when the armature 40 and magnet 41 are separated. A speed differential between opening and closing operations of the switch is thereby obtained because the arm 22 is held up by considerably less force than is required to move it to that position. When the rotational speed of the shaft 5 drops to a predetermined value the downward bias of springs 23 and 36 overcomes the upward reaction exerted by the plunger 16, and the plunger and arm 22 then move downwardly. As the arm moves downwardly sufficiently to bring the contacts 27 and 31 into engagement the armature 40 is more strongly attracted, accelerating the downward movement until the armature finally contacts the magnet. Should the downward movement of plunger 16 be arrested at about the time of engagement between contacts 27 and 31 the attraction of the armature 40 will be sufficiently strong to complete the downward movement of arm 22 by flexing the resilient abutment 25. Once armature 40 contacts the magnet 41 a relatively considerable increase in both upward force and upward movement of plunger 16 is necessary to separate the armature and magnet, this increment corresponding to and producing the speed differential between opening and closing operations of the switch. In this manner hunting and chattering of the contacts is positively prevented, and the life of the motor relay is greatly prolonged. Adjustment of the operating characteristics may be effected by substituting springs of different values, and by increasing or decreasing the strength of magnet 41. There are no loose adjustments to produce undesired variations during service.

Various changes may be made in the construction and arrangement, and all such modifications are included in the invention, the same being limited only by the prior art and the scope of the appended claims.

I claim:

1. A governor switch having a speed differential of operation comprising a speed responsive member movable to different positions in response to the speed of a rotating element, a movable switch arm, means to bias said switch arm toward said member, means to increase said bias at the limit of motion of said arm toward said member, and a resilient abutment adapted to transmit motion of said member to said arm when said member has moved sufficiently to overcome said increased bias, said abutment moving said arm out of the range of said increased bias and preventing return of said arm until said member is retracted to a new predetermined position.

2. A governor switch having a speed differential of operation comprising a rotatable shaft, governor weights on said shaft, a plunger movable to different positions by said weights in accordance with the speed of said shaft, a movable switch arm, a resilient member on said arm engageable by said plunger to move said arm, spring means to bias said arm in the direction of said plunger, and magnetic means attracting said arm in the direction of said bias, the arrangement being such that movement of said plunger to a predetermined position will deflect said resilient member sufficiently to move said arm away from said magnetic means, said resilient member thereafter holding said arm away from said magnetic means until said plunger is retracted to a second predetermined position.

3. In a speed responsive switching device, a movable switch arm, a contact resiliently mounted on said arm, a piece of magnetic material on said arm, a resiliently mounted relatively fixed contact, spring means biasing said switch arm to engage said contacts, a resilient member on said arm, an actuator engageable with said resilient member for operating said switch arm, and a permanent magnet fixedly supported adjacent said magnetic material to establish a pressure differential with respect to said actuator in the opening and closing movements of said contacts.

4. In a speed responsive switching device, a cover plate for a governor mechanism, a contact mounted on a flexible tongue on said plate, a movable switch arm carried by an overhanging cantilever spring element on said plate, a resilient abutment on said arm arranged for engagement by a speed responsive member in said governor mechanism, and a contact carried by a leaf spring element on said arm and engaging said first named contact by a mutual rocking and wiping action as said flexible tongue and leaf spring element both flex in the operation of said arm by said speed responsive member.

5. A speed responsive switching device comprising a housing, bearings in said housing, a hollow shaft in said bearings, a driving member resiliently mounted on one end of said shaft, a pair of bell crank levers pivotally mounted on said shaft within said housing, governor weights on said levers, a plunger in the other end of said shaft adapted for axial movement by said levers, a spring adapted to bias said plunger against said levers, a switch arm carried by said housing, a resilient member on said arm arranged to be engaged by said axial movement of said plunger to move said arm, a resilient contact on said arm, a resilient contact on said housing arranged for engagement by said first-named contact, a permanent magnet on said housing arranged to attract and bias said arm throughout a portion of its range of movement, and spring means arranged to bias said arm toward said magnet throughout its whole range of movement.

6. A unitary self-contained governor mechanism comprising a cupped housing, a bearing in the bottom of said cup portion, a cover plate closing the top of said cup portion, a bearing in said cover plate, a shaft in said bearings, governor weights on said shaft within said housing, a plunger in said shaft, said plunger being axially extensible by said governor weights beyond the end of said shaft and exteriorly of said cover plate, a contact on the exterior side of said cover plate, a movable switch contact arm mounted on the exterior side of said cover plate in cooperating relationship with said first named contact and overlying said end of said shaft for actuation by said plunger in response to the speed of said shaft, the other end of said shaft extending through said bottom bearing, and a driving member resiliently carried by said extending end of said shaft.

7. A governor switch comprising a speed responsive member movable to different positions in response to the speed of a rotating element, a movable switch arm, spring means to bias said arm in the direction of said member, magnetic means to increase said bias at the limit of motion of said arm toward said member, and a resilient abutment adapted to overcome said increased bias and transmit motion of said member to said arm upon movement of said member to a predetermined position, said resilient abutment thereafter holding said arm away from the influence of said magnetic means until said member is retracted with respect to said arm to a second predetermined position, to provide a speed differential of operation of said switch arm.

RALPH M. HEINTZ.